United States Patent
Schriefer et al.

(10) Patent No.: US 10,282,320 B2
(45) Date of Patent: May 7, 2019

(54) THREE-STAGE MEMORY ARRANGEMENT

(75) Inventors: Joern Schriefer, Griesheim (DE);
Juergen Scherschmidt, Frankfurt (DE);
Thomas Peichl, Wollstadt (DE)

(73) Assignee: CONTINENTAL TEVES AG & CO. OHG, Frankfurt (DE)

( * ) Notice: Subject to any disclaimer, the term of this patent is extended or adjusted under 35 U.S.C. 154(b) by 1369 days.

(21) Appl. No.: 13/813,767

(22) PCT Filed: Jul. 22, 2011

(86) PCT No.: PCT/EP2011/062680
§ 371 (c)(1),
(2), (4) Date: Feb. 1, 2013

(87) PCT Pub. No.: WO2012/016866
PCT Pub. Date: Feb. 9, 2012

(65) Prior Publication Data
US 2013/0132697 A1    May 23, 2013

(30) Foreign Application Priority Data
Aug. 3, 2010 (DE) .......................... 10 2010 038 850

(51) Int. Cl.
*G06F 13/16* (2006.01)
*G05B 19/042* (2006.01)

(52) U.S. Cl.
CPC ....... *G06F 13/1657* (2013.01); *G05B 19/042* (2013.01)

(58) Field of Classification Search
None
See application file for complete search history.

(56) References Cited

U.S. PATENT DOCUMENTS 5,802,345 A * 9/1998 Matsunami ............. G06F 13/24
703/27
8,112,784 B1 * 2/2012 Jackson ............. H04N 21/4122
348/565
(Continued)

FOREIGN PATENT DOCUMENTS

CN         1191615 A    8/1998
DE         35 33 163 A1    3/1986
(Continued)

OTHER PUBLICATIONS

Chinese Examination Report—dated Nov. 25, 2014.
PCT International Search Report—dated Sep. 12, 2011.
German Examination Report—dated Sep. 12, 2011.

*Primary Examiner* — Jared I Rutz
*Assistant Examiner* — Charles J Choi
(74) *Attorney, Agent, or Firm* — Brinks Gilson & Lione

(57) ABSTRACT

An electronic memory arrangement having at least three memory areas, a memory control unit, and a writing memory-accessing unit configured to carry out write access. A reading memory-accessing unit is configured to carry out read accesses. The memory control unit determines read and write access to the at least three memory areas, and the memory control unit is configured such that after the writing of a first data packet to one of the three memory areas, a following second data packet to be written is written to one on the three memory area to which read access does not place simultaneously during the write access of the second data packet.

14 Claims, 2 Drawing Sheets

(56) References Cited

U.S. PATENT DOCUMENTS

| | | | | |
|---|---|---|---|---|
| 2002/0069321 A1* | 6/2002 | Dickinson | | G06F 3/0619 |
| | | | | 711/113 |
| 2004/0044849 A1* | 3/2004 | Stence | | G06F 3/0611 |
| | | | | 711/126 |
| 2007/0091498 A1* | 4/2007 | Fujimori | | G11B 20/10527 |
| | | | | 360/53 |
| 2007/0180297 A1* | 8/2007 | Byrne | | G06F 11/1076 |
| | | | | 714/6.12 |
| 2010/0299481 A1* | 11/2010 | Conte | | G06F 12/0811 |
| | | | | 711/122 |

FOREIGN PATENT DOCUMENTS

| | | |
|---|---|---|
| DE | 195 29 718 A1 | 2/1997 |
| EP | 0 377 886 A2 | 12/1989 |

\* cited by examiner

THREE-STAGE MEMORY ARRANGEMENT

CROSS-REFERENCE TO RELATED APPLICATIONS

This application claims priority to German patent application number 10 2010 038 850.5, filed Aug. 3, 2010 and PCT/EP2011/062680, filed Jul. 22, 2011.

FIELD OF THE INVENTION

The invention relates to an electronic memory arrangement and to the use of the memory arrangement in motor vehicles.

BACKGROUND AND INTRODUCTORY DESCRIPTION OF THE INVENTION

The invention addresses the task of providing a memory arrangement which enables data packets to be written to or read from at least one memory area connected to two memory-accessing units in a consistent and especially conflict-free manner both in the case of a write access of a memory-accessing unit and in the case of a read access of another memory-accessing unit.

According to the invention, this object is achieved by the electronic memory arrangement in accordance with this invention.

The at least three memory areas are preferably part of a common physical memory unit or alternatively preferably in each case arranged in a separate physical memory unit.

The memory control unit is preferably designed in such a manner that after the writing of a data packet to one of the three memory areas, the subsequent data packet to be written is written to one of the other memory areas.

The at least two memory-accessing units are preferably constructed as separate electronic units and in this context especially one as a sensor and an evaluating circuit, and the other one as electronic control unit, especially preferably of a motor vehicle control system. In this context, it is appropriate that the memory control unit, the at least three memory areas and the multiplexer units are also arranged in this electronic control unit.

A data packet or defined data packet, respectively, includes preferably a number of data words (bytes). In particular, a data word comprises a defined number of bits, for example 8 bits or 16 bits. The size and/or structure of data packets and/or data words can differ with respect to the different memory-accessing units.

The memory control unit is preferably designed in such a manner that successive data packets to be written are written alternately to two of the three memory areas as long as there is no read access to one of these two memory areas.

It is preferred that the memory arrangement is constructed as a data buffer which enables one of the memory-accessing units to be provided with a data packet at any time per read access wherein the other memory-accessing unit can write data packets successively in each case to one of the memory areas, wherein the respective selection of the memory area to which a write access is taking place is performed by the memory control unit.

The memory arrangement is preferably constructed as data transmission channel between the at least two memory-accessing units, wherein the data transmission channel comprises the at least three memory areas and the memory accesses which are controlled by the memory control unit.

It is preferred that the at least three memory areas are connected at the input end and/or the output end via a, especially in each case one, multiplexer unit which is/are controlled by the memory control unit for assigning a read or write access of the memory-accessing units to one of the three memory areas.

The memory arrangement is preferably connected at the input end to the electronic evaluating circuit of a sensor element as at least writing memory-accessing unit, wherein the electronic evaluating circuit of the sensor element successively continuously provides, and writes into the memory arrangement, new data packets.

It is appropriate that the memory control unit is constructed in such a manner that it displays a defined address area only once towards the outside, that is to say with respect to the memory-accessing units, wherein the memory-accessing units and especially other external units address this address area only once and not its triple realization in the three memory areas. In this context, the address area externally visible or addressable is especially preferably as large as the internal address area of each of the at least three memory areas individually.

It is preferred that the memory control unit is constructed in such a manner that in the case of the presence of a data request signal, the read access is carried out to the last memory area written to, wherein the writing of a data packet performed last must have been concluded.

It is expedient that the memory arrangement is constructed in accordance with a selecting-reading "sample mode", wherein, after the transmission of a data freeze signal by a reading memory-accessing unit to the memory control unit, data are preserved in one of the memory areas in unchanged form for a defined period, for example until they are actually read out, whereupon the further write access to the memory area last written to, wherein this write access must be concluded, is prevented and/or blocked by the memory control unit until the desired data have been read out of this memory area at a later time or until a new data freeze signal is sent by the reading memory-accessing unit.

It is preferred that the memory arrangement additionally has a control read unit which is connected to each of the three memory areas, especially by means of a multiplexer, and the memory control unit and wherein the control read unit is designed in such a manner and activated in such a manner that in each case after a write process, the data packet written last is directly read out again and subsequently compared again with the data packet to be written lastly in order to detect one or more possible write errors, wherein the complete write access is ended only after the repeated reading-out and successful comparison by the control read unit. In particular, the memory arrangement is constructed in such a manner that after an unsuccessful comparison, that is to say data packets compared differ, the write process is repeated and/or a write error is signaled or noted electronically.

The data request signal and/or the data freeze signal is preferably replaced by a read access to a defined memory address.

It is preferred that the writing memory-accessing unit provides a signal with the information that a data packet has been written completely, as part of a write access, to the memory control unit.

It is expedient that the reading memory-accessing unit provides a signal with the information that a data packet has been read completely, as part of a read access, to the memory control unit.

The invention also relates to the use of the memory arrangement in motor vehicles, especially in an electronic control unit of a motor vehicle control system.

The three memory areas are preferably essentially constructed to be equal and have in each case the identical memory volume or address volume.

A multiplexer unit is preferably understood to be a multiplexer or a demultiplexer.

At the output end, the memory arrangement is connected preferably directly or indirectly to a memory-accessing unit and constructed as electronic control unit which successively reads particular data packets out of the memory arrangement.

The memory arrangement comprises especially more than three memory areas, for example redundant memory areas in order to increase the fault tolerance.

The information that data or data packets have been written or read completely as part of a write access or read access, or that the write access is ended, is preferably conveyed by the fact that this information is written to/into a defined address.

BRIEF DESCRIPTION OF THE DRAWINGS

In a diagrammatic representation.

DETAILED DESCRIPTION OF THE INVENTION

Figure 1:
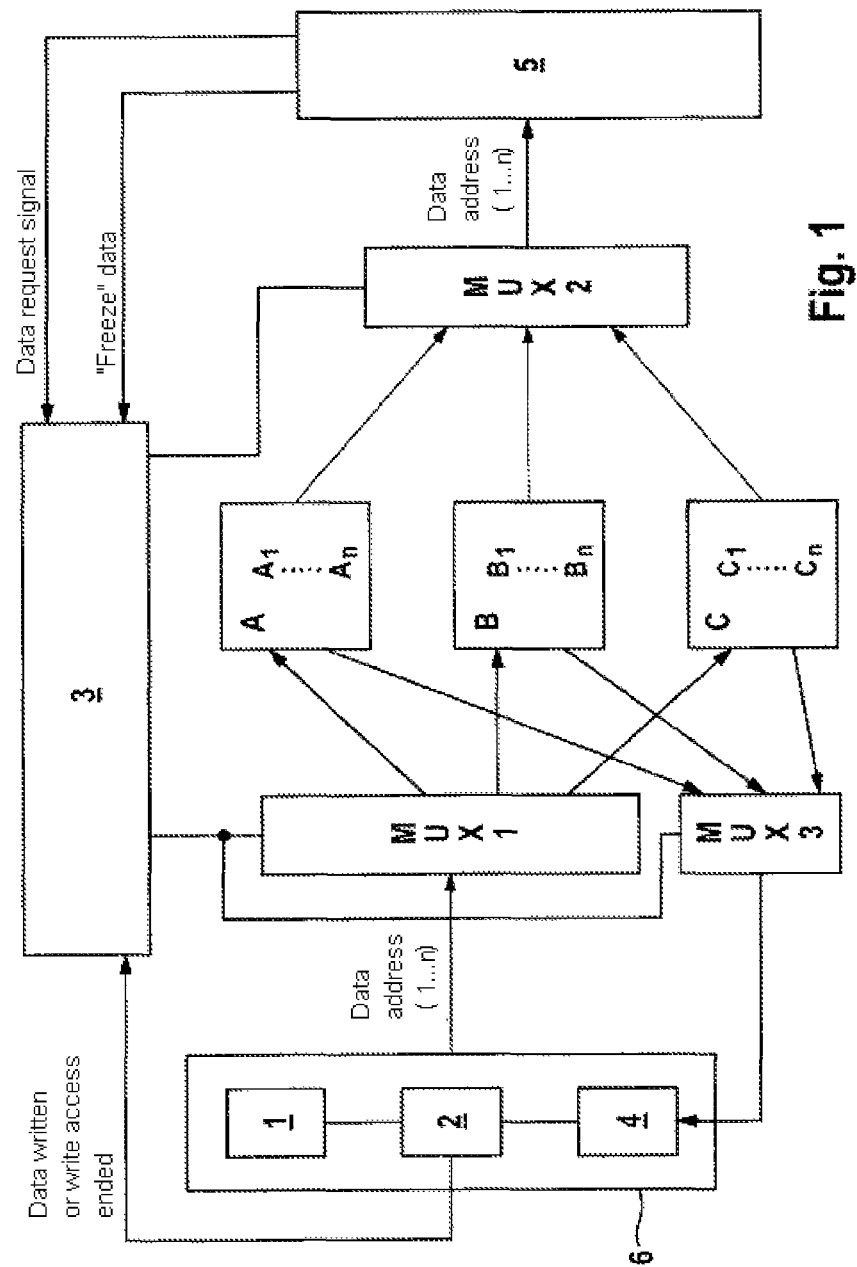
FIG. 1 shows an exemplary embodiment of a three-stage memory arrangement.

In the memory arrangement shown in FIG. 1, the test signals provided by the sensor element 1 are processed by the electronic evaluating circuit 2. Evaluating circuit 2 successively provides data packets or various data such as, for example, repeatedly, newly acquired measurement data and fault data which are to be stored at certain addresses. For this purpose, the memory arrangement comprises three memory areas A, B and C of a common physical memory having in each case the same address volume A1 to An, B1 to Bn and C1 to Cn. The write accesses and read accesses to these memory areas are defined or determined by the memory control unit 3. If new data are to be written by the evaluating circuit 2 or a corresponding write access is to take place, the multiplexer MUX1, at which these data are then present at the input end is activated by the memory control unit 3 in such a manner that the new data or a new data packet, respectively, are written to one of the memory areas A, B, or C in the desired address area. At the input end, the memory arrangement is connected to a predominantly writing memory-accessing unit which, according to this example, comprises the sensor element 1, the electronic evaluating circuit 2 and a control read unit 4 and at the output end to a predominantly reading memory-accessing unit 5 which, for example, can be constructed as an electronic control unit which accesses the sensor data.

At the signal "data written" or "write access occurring", the evaluating circuit 2 informs the memory control unit at the end of a corresponding write access in which new data or a new data packet follow, that this write access is ended and the corresponding memory area can be released for a read access or a new write access.

In this process, the new data packet is written, for example, to the first memory area A whilst, for example, a read access to memory area C takes place. When this write process is ended, the subsequent new data packet is written to the intended address area of the second memory area B. As long as the read access to memory area C is not ended, the write accesses to the first and the second memory area A, B are made alternately when the corresponding next new data are present.

When a subsequent data request signal "read data" or "request data" of the read unit 5 is present in "continuous mode", the subsequent read access is made suitably to the memory area last written to, namely A or B, wherein this last write access carried out must have been concluded. As long as the read access is not ended, no further write access to this memory area is allowed by the memory control unit and the two remaining memory areas, that is to say A or B and additionally C are written to alternately, with the new data or data packets following from now on until a new read access occurs. The reading-out of the data is also controlled by the memory control unit 3 and performed by the multiplexer unit MUX2.

In the "sample mode" the read unit 5 transmits a data freeze signal to the memory control unit 3 whereupon data are preserved in unchanged form for a defined period, for example until they are actually read out, and the further write access to the memory area last written to, this write access having to be concluded, is prevented or blocked by the memory control unit until the desired data have been read out of this memory area at a later time or until a new data freeze signal is sent by the read unit.

In "sample mode", the read unit 5 transmits a data freeze signal to the memory control unit 3 whereupon data are preserved in unchanged form for a defined period, for example until they are actually read out, and the further write access to the memory area last written to, wherein this write access must be concluded, is prevented or blocked by the memory control unit until the desired data have been read out of this memory area at a later time or until a new data freeze signal is sent by the read unit.

The writing memory-accessing unit 6 also comprises the control read unit 4 which is connected to each of the three memory areas A, B and C by means of a multiplexer MUX3, and to the memory control unit 3 and which is designed in such a manner and activated in such a manner that in each case after a write process, at least the at least one written data packet is read out again directly and subsequently compared directly again with the data packet to be written in the evaluating circuit 2 in order to recognize one or more possible write errors. It is only after the repeated reading out by the control read unit 4 that the complete write access is ended and the control unit 2 sends the corresponding signal, for example "data written" to the memory control unit 3.

Figure 2:
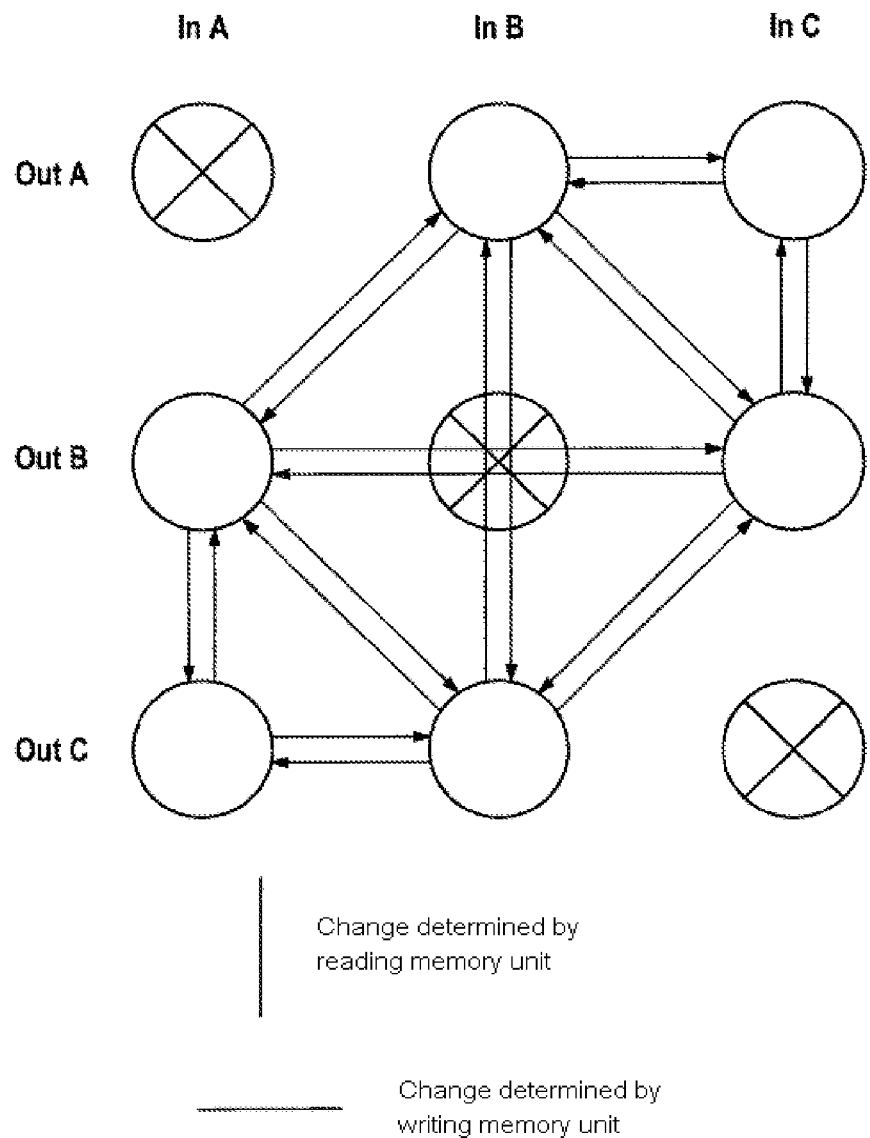
FIG. 2 shows the read and write access options simultaneously for two memory areas by means of a matrix representation illustrated by way of example.

In FIG. 2, the changes of the write accesses "in" to the memory areas A, B and C and the changes of the read accesses "out" to the memory areas A, B, C are illustrated. In this context, simultaneous writing "in" and reading "out" to a memory area is not allowed which is illustrated by an X. The arrows in the vertical direction identify transitions at which, after the end of a read access, a new read access to another memory area having more up to date data takes place. The horizontal arrows identify the changes of the write accesses in each case after the end of a completed write access. The diagonal arrows identify transitions with simultaneous end of a write access and the end of a read access.

While the above description constitutes the preferred embodiment of the present invention, it will be appreciated that the invention is susceptible to modification, variation and change without departing from the proper scope and fair meaning of the accompanying claims.

The invention claimed is:

1. An electronic memory arrangement comprising:
   at least three memory areas;
   a memory control unit;
   a writing memory-accessing unit which is configured to carry out a write access;
   a reading memory-accessing unit which is configured to carry out a read access;
   wherein the memory control unit determines the write or read access to the at least three memory areas;
   wherein the memory control unit is configured such that after a writing of a first data packet to one of the at least three memory areas, a following second data packet to be written is written to one of the at least three memory areas to which the read access does not take place simultaneously during the write access of the second data packet; and
   the memory arrangement is configured to provide a selecting-reading sample mode, wherein after a transmission of a data freeze signal by the reading memory-accessing unit to the memory control unit, data are preserved in one of the at least three memory areas in an unchanged form for a defined period of time until data are actually read out, whereupon a further write access to a memory area last written to, wherein the further write access must be concluded, is prevented or blocked by the memory control unit until data have been read out of a memory area at a later time or until a new data freeze signal is sent by the reading memory-accessing unit.

2. The memory arrangement as claimed in claim 1, further comprising in that the memory control unit is further configured such that after the writing of the first data packet to one of the at least three memory areas, the following second data packet to be written is written to another of the at least three memory areas.

3. The memory arrangement as claimed in claim 1 further comprising in that the memory control unit is configured such that the second data packet and further successive data packets to be written are written alternately to two of the at least three memory areas as long as there is no read access to either of the two memory areas of the at least three memory areas.

4. The memory arrangement as claimed in claim 1 further comprising in that the memory arrangement includes a data buffer which enables the reading memory-accessing unit to be provided with a data packet at any time for the read access, wherein the writing memory-accessing units can write data packets successively to one of the at least three memory areas, wherein a respective selection of the memory area to which the write access is taking place is performed by the memory control unit.

5. The memory arrangement as claimed in claim 1 further comprising in that the memory arrangement forms a data transmission channel between the memory-accessing units, wherein the data transmission channel comprises the at least three memory areas and the memory-accessing units are controlled by the memory control unit.

6. The memory arrangement as claimed in claim 1 further comprising in that the at least three memory areas are connected at an input end or at an output end via a multiplexer unit which is controlled by the memory control unit for assigning the read access or the write access of the memory-accessing units to the at least three memory areas.

7. The memory arrangement as claimed in claim 1 further comprising in that a memory arrangement forming the at least three memory areas is connected at an input end to an electronic evaluating circuit of a sensor element as part of the writing memory-accessing unit, wherein the electronic evaluating circuit of the sensor element successively continuously provides and writes into the memory arrangement, new ones of the data packets.

8. The memory arrangement as claimed in claim 1 further comprising in that the memory control unit is configured to present a defined address area of the at least three memory areas only once with respect to the memory-accessing units, wherein one of the memory-accessing units address the defined address area only once and not redundantly in the at least three memory areas.

9. The memory arrangement as claimed in claim 1 further comprising in that the memory control unit is configured such that in a case of a presence of a data request signal, the read access is carried out to a last of the at least three memory areas written to, wherein a writing of a data packet performed last must have been concluded.

10. The memory arrangement as claimed in claim 1 further comprising in that the memory arrangement having a control read unit which is connected to the at least three memory areas by means of a multiplexer and the memory control unit and wherein the control read unit is configured and activated such that after a write process, a data packet written last is directly read out again and compared again with the data packet to be written lastly in order to detect one or more possible write errors, wherein a complete write access is ended only after a repeated reading-out and successful comparison by the control read unit.

11. The memory arrangement as claimed in claim 1 further comprising in that the data request signal or the data freeze signal is replaced by the read access to a defined memory address.

12. The memory arrangement as claimed in claim 1 further comprising in that the writing memory-accessing unit is configured to provide a signal with information that a data packet has been written completely, as part of the write access, to the memory control unit.

13. The memory arrangement as claimed in claim 1 further comprising in that the reading memory-accessing unit provides a signal with information that a data packet has been read completely, as part of a read access, to the memory control unit.

14. The memory arrangement as claimed in claim 1 integrated into an electronic control unit of a motor vehicle control system.

* * * * *